Patented Jan. 27, 1942

2,271,316

UNITED STATES PATENT OFFICE 2,271,316

CERAMIC COMPOSITION

Harry Spurrier, Toledo, Ohio

No Drawing. Application September 6, 1938,
Serial No. 228,591

6 Claims. (Cl. 106—68)

My invention has for its object to provide a new and efficient composition for ceramic bodies, generally, such as porcelain ware, earthen ware, stone ware, and coarse bodies, such as refractories.

Compositions containing the invention may be modified by varying the ingredients of the composition to produce different characteristic properties, both as to shaping and drying in advance of firing and in the finally formed bodies subsequent to the firing.

The invention particularly provides the inclusion of finely divided non-graphitic carbon, such as charcoal carbon, in relatively small quantities in the commonly used ceramic batches, to produce a marked decrease in the fired shrinkage, increase in the apparent specific gravity, decrease in porosity and permeability, and to greatly increase the strength of the bodies formed from the batches. The batches contain the usual ingredients that are commonly used according to the characteristic properties that it is desired to produce in the articles formed therefrom when fired under conditions that such batches are usually fired in the production of the articles for which the batches are designed and when the batches contain a relatively small amount of finely divided carbon, there is a marked improvement in the characteristic properties of the resultant product.

Vegetable carbon in the form of wood charcoal, is used. When charcoal is used, it is ground to not coarser than 250 mesh. The amount of carbon is, preferably, between one-half of one per cent and one per cent, by weight. Where the bodies contain less than one-half of one per cent of carbon or the amount of carbon is increased above one per cent, the characteristic advantages usually decrease and there is, also, a change in its effectiveness in certain compositions when the carbon is less than one-eighth of one per cent and in other instances where there is more than two per cent of carbon.

A mixture of 50 parts, by weight, of kaolin, such as that known as "Edgar plastic kaolin," 25 parts of ground flint, 25 parts of ground feldspar, ground to minus 140 mesh, when thoroughly mixed with 0.5 part of carbon, in the form of pulverized charcoal, about 325 mesh, and the usual amount of water required to produce the desired plasticity, the properties were greatly improved for shaping and manipulation in the production of their final forms and, when fired, there was a marked improvement in the desired physical properties of the finished bodies. The shrinkage, when fired, was reduced 27 per cent; subsequent to firing, the apparent specific gravity was increased from 1.66 to 1.79; the porosity was decreased from 28.7 to 25.4; the permeability, at two pounds pressure, was decreased from 123 cc. to 53.1 cc. per 100 square inches, one inch thick; the modulus of rupture per square inch was increased from 1,162 pounds to 2,010 pounds per square inch.

In the application of the carbon to the making of ceramic bodies, carbon, in amounts according to the results that it is desired to produce, is introduced into the mixing vessel, or the wet pan in case of "stiff mud" operations, or in the mixing "blunger" in the case of slip preparation, and mixed until the carbon is uniformly distributed throughout the batch. The resultant raw body, when containing a relatively small proportion of finely divided carbon, is considerably stiffer than when the carbon is omitted from the batches and the tensile strength is increased frequently to the extent of 100 per cent. The batches containing carbon, when worked, are substantially free from air pockets and lamination, are high in density and have a large tensile strength or toughness in the green state and dry without cracking or material warping. The drying properties are greatly improved and freedom from blistering is increased. The advantageous characteristics of the unfired batches carry through the firing operations and into the fired state, although the carbon is burned out. The advantageous results existing in the fired body are evidently due, not to its presence in the fired body, but due to its having been present in the raw batch from which the body is formed.

The characteristics of the fired carbon containing bodies are improved in many particulars. When fired, the bodies are low in porosity, low in permeability, low in thermal expansion, free from material warpage and substantially free from internal strain. The porosity is six per cent less, than fired bodies of the same batch composition from which the carbon is omitted, the permeability is 20 per cent to 50 per cent lower, the apparent density is increased from seven to eight per cent, and the strength is greatly increased, nearly doubled. Owing to the generally improved structures, the bodies register a pyrometric cone equivalent to from two to three cones higher than the corresponding batches without the carbon, which enables the production of many of the improved properties. Also, the carbon, in the final bodies, reduces the expansion on heating from the room temperature to 270° C. by over 20 per cent. Moreover, the expansion curve is more regular in form indicating that irregular expansion, caused by silica present in the body, is noticeably reduced.

I claim:

1. In a batch for producing ceramic bodies including mixed alumina and silica compounds and finely divided wood charcoal carbon in an amount less than one and one-half per cent by weight and more than one-fourth of one per cent.

2. A ceramic composition for producing ceramic bodies and containing finely divided wood charcoal carbon in an amount from one-half of one per cent to one per cent by weight.

3. In a batch for producing ceramic bodies including mixed alumina and silica compounds and finely divided wood charcoal carbon in an amount from one-half of one per cent to one per cent by weight.

4. A composition for producing ceramic bodies and containing finely divided wood charcoal carbon in an amount of 2 per cent and less by weight.

5. In a batch for producing ceramic bodies including mixed alumina and silica compounds and finely divided wood charcoal carbon in an amount of 2 per cent and less by weight.

6. A ceramic composition for producing ceramic bodies and containing finely divided wood charcoal carbon in amounts of 2 per cent to one-tenth of one per cent by weight.

HARRY SPURRIER.